(12) United States Patent
Cai et al.

(10) Patent No.: US 12,451,966 B1
(45) Date of Patent: Oct. 21, 2025

(54) OPTICAL COMMUNICATION SYSTEMS AND SILICON PHOTONICS PASSIVE MULTIPLEXERS AND DEMULTIPLEXERS HAVING MACH-ZEHNDER INTERFEROMETER STRUCTURES

(71) Applicant: Marvell Asia Pte Ltd, Singapore (SG)

(72) Inventors: Hong Cai, San Jose, CA (US); Yun Wang, Ottawa (CA); Jie Lin, Cupertino, CA (US)

(73) Assignee: Marvell Asia Pte Ltd, Singapore (SG)

( * ) Notice: Subject to any disclaimer, the term of this patent is extended or adjusted under 35 U.S.C. 154(b) by 238 days.

(21) Appl. No.: 18/142,299

(22) Filed: May 2, 2023

Related U.S. Application Data (60) Provisional application No. 63/337,653, filed on May 3, 2022.

(51) Int. Cl.
  *H04B 10/40* (2013.01)
  *H04B 10/079* (2013.01)
  *H04J 14/02* (2006.01)

(52) U.S. Cl.
  CPC ......... *H04B 10/40* (2013.01); *H04B 10/0795* (2013.01); *H04J 14/0209* (2013.01)

(58) Field of Classification Search
  CPC .. H04B 10/40; H04B 10/0795; H04J 14/0209
  USPC .......................................................... 398/34
  See application file for complete search history.

(56) References Cited

U.S. PATENT DOCUMENTS

| | | | | |
|---|---|---|---|---|
| 9,225,454 B1 * | 12/2015 | Liu | ...................... | H04J 14/0305 |
| 10,677,987 B1 * | 6/2020 | Dumais | .................. | G02B 6/276 |
| 10,935,726 B1 * | 3/2021 | Lee | ........................ | G02F 1/3136 |
| 2004/0018017 A1 * | 1/2004 | Hatayama | .......... | G02B 6/12007 398/43 |
| 2015/0241633 A1 * | 8/2015 | Kusaka | .................. | G02F 1/2255 385/24 |
| 2015/0263819 A1 * | 9/2015 | Fincato | .............. | G02B 6/29352 398/43 |
| 2021/0405499 A1 * | 12/2021 | Srinivasan | ........... | H04B 10/503 |

(Continued)

OTHER PUBLICATIONS

Cheung, Stanley et al "Ultra-Compact Silicon Photonic 512×512 25 GHz Arrayed Waveguide Grating Router," IEEE Journal of Selected Topics in Quantum Electronics, vol. 20, No. 4, Jul./Aug. 2014.

(Continued)

*Primary Examiner* — Dalzid E Singh (57) ABSTRACT

An optical communication system includes a transceiver device and a passive multiplexer and demultiplexer (PMAD). The transceiver device transmits or receives optical signals. The PMAD has a Mach-Zehnder interferometer structure, is connected to the transceiver device, and operates as a passive multiplexer or a passive demultiplexer. The PMAD includes: a first arm including a first waveguide, the first arm having a first dimension; a second arm including i) a second waveguide, and ii) a third waveguide, the second waveguide having a second dimension, the third waveguide having a third dimension, the second dimension being based on the first dimension and finely adjusts at least one performance parameter of the passive multiplexer and demultiplexer, and the third dimension being based on the first dimension and coarsely adjusts the at least one performance parameter; and a splitter and a coupler that propagate the optical signals.

33 Claims, 7 Drawing Sheets

(56) References Cited

U.S. PATENT DOCUMENTS

2022/0390678 A1* 12/2022 Guo .................. G02B 6/29352
2023/0152515 A1* 5/2023 Ravi .................. G02B 6/1228
385/43

OTHER PUBLICATIONS

Goh, Takashi et al, "Multiband Optical Switch Technology," OFC 2022 © Optica Publishing Group 2022.
Horst, Folkert et al "Cascaded Mach-Zehnder wavelength filters in silicon photonics for low loss and flat pass-band WDM (de-)multiplexing," IBM Research published May 6, 2013.
Jeong, Seok-Hwan et al "Si-nanowire-based multistage delayed Mach-Zehnder interferometer optical MUX/DeMUX fabricated by an ArF-immersion lithography process on a 300 mm SOI wafer," Optics Letters / vol. 39, No. 13 / Jul. 1, 2014.
Suzuki, Keijiro et al, "Wavelength (DE)MUX-and-Switch Based on 5.5%-Δ-Silica PLC/Silicon Photonics Hybrid Platform," Journal of Lightwave Technology, vol. 40, No. 6, Mar. 15, 2022.

* cited by examiner

OPTICAL COMMUNICATION SYSTEMS AND SILICON PHOTONICS PASSIVE MULTIPLEXERS AND DEMULTIPLEXERS HAVING MACH-ZEHNDER INTERFEROMETER STRUCTURES

CROSS-REFERENCE TO RELATED APPLICATIONS

This application claims the benefit of U.S. Provisional Application No. 63/337,653, filed on May 5, 2022. The entire disclosure of the application referenced above is incorporated herein by reference.

FIELD

The present disclosure relates to waveguide devices, and more specifically to silicon photonic multiplexers and demultiplexers.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Broadband communication systems can include silicon photonics systems that satisfy different bandwidth, phase, free spectral range (FSR), signal-to-noise ratio, and power requirements for short-reach, metro, or long-haul data transmission. Silicon photonics devices can include active components and passive components. The active components can include modulators, switches, photodetectors and other active components. The passive components can include power splitters, polarization splitter-rotators, input and output couplers, and other passive components. The active and passive components can include and/or be connected to each other using waveguides.

SUMMARY

An optical communication system is disclosed and includes a transceiver device and a first passive multiplexer and demultiplexer. The first passive multiplexer and demultiplexer having a Mach-Zehnder interferometer structure and configured to transmit the optical signals directly or indirectly to the transceiver device or to receive the optical signals directly or indirectly from the transceiver device and to operate as a passive multiplexer or a passive demultiplexer. The first passive multiplexer and demultiplexer includes: a first arm including a first waveguide, the first arm having a first dimension; a second arm including i) a second waveguide, and ii) a third waveguide, the second waveguide having a second dimension, the third waveguide having a third dimension, the second dimension being based on the first dimension and finely adjusts at least one performance parameter of the first passive multiplexer and demultiplexer, and the third dimension being based on the first dimension and coarsely adjusts the at least one performance parameter; a splitter configured to propagate the optical signals having respective wavelengths between i) a first port and ii) the first waveguide and the second waveguide; and a coupler configured to propagate the optical signals between i) the first waveguide and the third waveguide and ii) a second port and a third port.

In other features, the first waveguide has a first constant width from a first end of the first waveguide at the splitter to a second end of the first waveguide at the coupler.

In other features, the second waveguide includes a first central region having a second constant width from a first end of the first central region near the splitter to a second end of the first central region near the third waveguide. The third waveguide includes a second central region having a third constant width from a first end of the second central region near the second waveguide to a second end of the second central region near the coupler.

In other features, the first waveguide has a first width. The second waveguide has a second width. The third waveguide has a third width. The second width is greater than the first width. The third width is smaller than the first width.

In other features, the at least one performance parameter includes at least one of free spectral range of the passive multiplexer and demultiplexer, phase delay of the second arm, and phase difference between the first arm and the second arm.

In other features, the splitter is configured to propagate a first optical signal having a first wavelength and a second optical signal having a second wavelength, the optical signals including the first optical signal and the second optical signal. The first dimension, the second dimension and the third dimension provide a free spectral range of the first passive multiplexer and demultiplexer of twice a difference between the first wavelength and the second wavelength.

In other features, the splitter is configured to propagate a first optical signal having a first wavelength and a second optical signal having a second wavelength, the optical signals including the first optical signal and the second optical signal. A length of the first waveguide, a length of the second waveguide, and a length of the third waveguide provide a free spectral range of the passive multiplexer and demultiplexer of twice a difference between the first wavelength and the second wavelength.

In other features, at least one of the splitter and the coupler is a multi-mode interferometer.

In other features, the splitter is configured to propagate a first optical signal having a first wavelength and a second optical signal having a second wavelength. The optical signals include the first optical signal and the second optical signal. A phase difference between the first arm and the second arm for the first wavelength is equal to $(2n-1/2)\pi$, where n is an integer. A phase difference between the first arm and the second arm for the second wavelength is equal to $(2m+1/2)\pi$, where m is an integer.

In other features, the splitter is configured to propagate a first optical signal having a first wavelength and a second optical signal having a second wavelength. The optical signals include the first optical signal and the second optical signal. A phase difference between the first arm and the second arm for the first wavelength is equal to $(2m+1/2)\pi$, where n is an integer. A phase difference between the first arm and the second arm for the second wavelength is equal to $(2n-1/2)\pi$, where m is an integer.

In other features, the second waveguide includes a first central region, and a first transition region connecting a port of the splitter to the first central region. A second transition region is connected to the first central region. The third waveguide includes: a second central region connected to the second transition region; and a third transition region connecting the second central region to the coupler.

In other features, a length of the first waveguide is equal to a sum of the lengths of the second waveguide and the third waveguide. The second waveguide and the third waveguide include respective portions of the second transition region.

In other features, an overall length of the first arm is equal to an overall length of the second arm.

In other features, the splitter includes a first port connected to the first arm and a second port connected to the second arm. The coupler includes a first port connected to the first arm and a second port connected to the second arm. A first distance between a center of the first port of the splitter and a center of the second port of the splitter is equal to a second distance between a center of the first port of the coupler and a center of the second port of the coupler.

In other features, the splitter, the first arm, the second arm and the coupler include silicon.

In other features, the optical communication system further includes a silicon-on-insulator platform including: a substrate including silicon; a buried oxide layer disposed on the substrate; and an oxide cladding layer including the first passive multiplexer and demultiplexer.

In other features, the optical communication system further includes a cascaded passive multiplexer and demultiplexer including the first passive multiplexer and demultiplexer. The cascaded passive multiplexer and demultiplexer is configured to transmit the optical signals directly or indirectly to the transceiver device or to receive the optical signals directly or indirectly from the transceiver device and to operate as a cascaded passive multiplexer or a cascaded passive demultiplexer.

In other features, an optical communication system is disclosed and includes: a transceiver device configured to transmit or receive optical signals; and a first passive multiplexer and demultiplexer. The first passive multiplexer and demultiplexer having a Mach-Zehnder interferometer structure and configured to transmit the optical signals directly or indirectly to the transceiver device or to receive the optical signals directly or indirectly from the transceiver device and to operate as a passive multiplexer or a passive demultiplexer. The first passive multiplexer and demultiplexer includes: a first arm including a first waveguide, the first arm having a first width; a second arm including i) a second waveguide, and ii) a third waveguide, the second waveguide having a second width, the third waveguide having a third width, the second width being greater than the first width, and the third width being smaller than the first width; a splitter configured to propagate the optical signals having respective wavelengths between i) a first port and ii) the first waveguide and the second waveguide; and a coupler configured to propagate the optical signals between i) the first waveguide and the third waveguide and ii) a second port and a third port.

In other features, the second width is greater than the first width. The third width is smaller than the first width.

In other features, the splitter is configured to propagate a first optical signal having a first wavelength and a second optical signal having a second wavelength. The optical signals include the first optical signal and the second optical signal. A length of the first waveguide. A length of the second waveguide. A length of the third waveguide provides a free spectral range of the passive multiplexer and demultiplexer of twice a difference between the first wavelength and the second wavelength.

In other features, at least one of the splitter and the coupler is a multi-mode interferometer.

In other features, the splitter is configured to propagate a first optical signal having a first wavelength and a second optical signal having a second wavelength. The optical signals include the first optical signal and the second optical signal. A phase difference between the first arm and the second arm for the first wavelength is equal to $(2n-1/2)\pi$, where n is an integer. A phase difference between the first arm and the second arm for the second wavelength is equal to $(2m+1/2)\pi$, where m is an integer.

In other features, the splitter is configured to propagate a first optical signal having a first wavelength and a second optical signal having a second wavelength. The optical signals include the first optical signal and the second optical signal. A phase difference between the first arm and the second arm for the first wavelength is equal to $(2m+1/2)\pi$, where n is an integer.

In other features, a phase difference between the first arm and the second arm for the second wavelength is equal to $(2n-1/2)\pi$, where m is an integer.

In other features, the second waveguide includes a first central region and a first transition region connecting a port of the splitter to the first central region. A second transition region is connected to the first central region. A second central region is connected to the second transition region. A third transition region connects the second central region to the coupler.

In other features, a length of the first waveguide is equal to a sum of the lengths of the second waveguide and the third waveguide. The second waveguide and the third waveguide include respective portions of the second transition region.

In other features, an overall length of the first arm is equal to an overall length of the second arm.

In other features, the optical communication system further includes a cascaded passive multiplexer and demultiplexer including the first passive multiplexer and demultiplexer. The cascaded passive multiplexer and demultiplexer is configured to transmit the optical signals directly or indirectly to the transceiver device or to receive the optical signals directly or indirectly from the transceiver device and to operate as a cascaded passive multiplexer or a cascaded passive demultiplexer.

In other features, a passive multiplexer and demultiplexer having a Mach-Zehnder interferometer structure is disclosed. The passive multiplexer and demultiplexer includes: a first arm including a first waveguide, the first arm has a first dimension; a second arm including i) a second waveguide, and ii) a third waveguide, the second waveguide has a second dimension, the third waveguide has a third dimension, the second dimension is based on the first dimension and finely adjusts at least one performance parameter of the passive multiplexer and demultiplexer, and the third dimension is based on the first dimension and coarsely adjusts the at least one performance parameter; a splitter configured to propagate optical signals having respective wavelengths between i) a first port and ii) the first waveguide and the second waveguide; and a coupler configured to propagate the optical signals between i) the first waveguide and the third waveguide and ii) a second port and a third port.

In other features, the first waveguide has a first constant width from a first end of the first waveguide at the splitter to a second end of the first waveguide at the coupler.

In other features, the second waveguide includes a first central region having a second constant width from a first end of the first central region near the splitter to a second end of the first central region near the third waveguide. The third waveguide includes a second central region having a third constant width from a first end of the second central region near the second waveguide to a second end of the second central region near the coupler.

In other features, the first waveguide has a first width. The second waveguide has a second width. The third waveguide has a third width. The second width is greater than the first width. The third width is smaller than the first width.

In other features, the at least one performance parameter includes at least one of free spectral range of the passive multiplexer and demultiplexer, phase delay of the second arm, and phase difference between the first arm and the second arm.

In other features, the splitter is configured to propagate a first optical signal having a first wavelength and a second optical signal having a second wavelength. The optical signals include the first optical signal and the second optical signal. The first dimension, the second dimension and the third dimension provide a free spectral range of the passive multiplexer and demultiplexer of twice a difference between the first wavelength and the second wavelength.

In other features, the splitter is configured to propagate a first optical signal having a first wavelength and a second optical signal having a second wavelength, the optical signals including the first optical signal and the second optical signal. Aa length of the first waveguide, a length of the second waveguide, and a length of the third waveguide provide a free spectral range of the passive multiplexer and demultiplexer of twice a difference between the first wavelength and the second wavelength.

In other features, at least one of the splitter and the coupler is a multi-mode interferometer.

In other features, the splitter is configured to propagate a first optical signal having a first wavelength and a second optical signal having a second wavelength. The optical signals include the first optical signal and the second optical signal. A phase difference between the first arm and the second arm for the first wavelength is equal to $(2n-1/2)\pi$, where n is an integer. A phase difference between the first arm and the second arm for the second wavelength is equal to $(2m+1/2)\pi$, where m is an integer.

In other features, the splitter is configured to propagate a first optical signal having a first wavelength and a second optical signal having a second wavelength. The optical signals include the first optical signal and the second optical signal. A phase difference between the first arm and the second arm for the first wavelength is equal to $(2m+1/2)\pi$, where n is an integer. A phase difference between the first arm and the second arm for the second wavelength is equal to $(2n-1/2)\pi$, where m is an integer.

In other features, the second waveguide includes a first central region and a first transition region connecting a port of the splitter to the first central region. A second transition region is connected to the first central region. The third waveguide includes: a second central region is connected to the second transition region; and a third transition region connecting the second central region to the coupler.

In other features, a length of the first waveguide is equal to a sum of the lengths of the second waveguide and the third waveguide. The second waveguide and the third waveguide include respective portions of the second transition region.

In other features, an overall length of the first arm is equal to an overall length of the second arm.

In other features, the splitter includes a first port connected to the first arm and a second port connected to the second arm. The coupler includes a first port connected to the first arm and a second port connected to the second arm. A first distance between a center of the first port of the splitter and a center of the second port of the splitter is equal to a second distance between a center of the first port of the coupler and a center of the second port of the coupler.

In other features, the splitter, the first arm, the second arm and the coupler include silicon.

In other features, a silicon-on-insulator platform is disclosed and includes: a substrate including silicon; a buried oxide layer disposed on the substrate; and an oxide cladding layer including the passive multiplexer and demultiplexer.

In other features, an optical communication system is disclosed that includes: a transceiver device configured to transmit or receive the optical signals; and the passive multiplexer and demultiplexer configured to transmit the optical signals directly or indirectly to the transceiver device or to receive the optical signals directly or indirectly from the transceiver device and to operate as a passive multiplexer or a passive demultiplexer.

In other features, an optical communication system is disclosed and includes: a transceiver device; and a cascaded passive multiplexer and demultiplexer including the passive multiplexer and demultiplexer, the cascaded passive multiplexer and demultiplexer configured to transmit the optical signals directly or indirectly to the transceiver device or to receive the optical signals directly or indirectly from the transceiver device and to operate as a cascaded passive multiplexer or a cascaded passive demultiplexer.

In other features, a passive multiplexer and demultiplexer having a Mach-Zehnder interferometer structure is disclosed. The passive multiplexer and demultiplexer includes: a first arm including a first waveguide, the first arm having a first width; a second arm including i) a second waveguide, and ii) a third waveguide, the second waveguide having a second width, the third waveguide having a third width, the second width being greater than the first width, and the third width being smaller than the first width; a splitter configured to propagate optical signals having respective wavelengths between i) a first port and ii) the first waveguide and the second waveguide; and a coupler configured to propagate the optical signals between i) the first waveguide and the third waveguide and ii) a second port and a third port.

In other features, the second width is greater than the first width. The third width is smaller than the first width.

In other features, the splitter is configured to propagate a first optical signal having a first wavelength and a second optical signal having a second wavelength. The optical signals include the first optical signal and the second optical signal. A length of the first waveguide, a length of the second waveguide, and a length of the third waveguide provide a free spectral range of the passive multiplexer and demultiplexer of twice a difference between the first wavelength and the second wavelength.

In other features, at least one of the splitter and the coupler is a multi-mode interferometer.

In other features, the splitter is configured to propagate a first optical signal having a first wavelength and a second optical signal having a second wavelength. The optical signals include the first optical signal and the second optical signal. A phase difference between the first arm and the second arm for the first wavelength is equal to $(2n-1/2)\pi$, where n is an integer. A phase difference between the first arm and the second arm for the second wavelength is equal to $(2m+1/2)\pi$, where m is an integer.

In other features, the splitter is configured to propagate a first optical signal having a first wavelength and a second optical signal having a second wavelength. The optical signals include the first optical signal and the second optical signal. A phase difference between the first arm and the second arm for the first wavelength is equal to $(2m+1/2)\pi$, where n is an integer. A phase difference between the first arm and the second arm for the second wavelength is equal to $(2n-1/2)\pi$, where m is an integer.

In other features, the second waveguide includes a first central region, and a first transition region connecting a port of the splitter to the first central region. A second transition region is connected to the first central region. The third waveguide includes: a second central region is connected to the second transition region; and a third transition region connecting the second central region to the coupler.

In other features, a length of the first waveguide is equal to a sum of the lengths of the second waveguide and the third waveguide. The second waveguide and the third waveguide include respective portions of the second transition region.

In other features, an overall length of the first arm is equal to an overall length of the second arm.

In other features, an optical communication system is disclosed that includes: a transceiver device configured to transmit or receive the optical signals; and the passive multiplexer and demultiplexer configured to transmit the optical signals directly or indirectly to the transceiver device or to receive the optical signals directly or indirectly from the transceiver device and to operate as a passive multiplexer or a passive demultiplexer.

In other features, an optical communication system is disclosed and includes: a transceiver device; and a cascaded passive multiplexer and demultiplexer including the passive multiplexer and demultiplexer, the cascaded passive multiplexer and demultiplexer configured to transmit the optical signals directly or indirectly to the transceiver device or to receive the optical signals directly or indirectly from the transceiver device and to operate as a cascaded passive multiplexer or a cascaded passive demultiplexer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Silicon photonics circuits used for broadband telecommunication, data center connectivity and bio-sensing applications include active components and passive components. Waveguides are used to optically route signals to various active and passive components. The active and passive components can include multiplexers and demultiplexers. Optical multiplexing and demultiplexing are used for multichannel optical communications. Traditional silicon photonics multiplexers and demultiplexers have active MZI structures or cascaded MZI structures. The active structures can be single stage MZIs and can include heaters, power supplies and control for actively changing performance characteristics of the MZI structures. A cascaded MZI structure has multiple transmission paths (or arms) with respective phase delays for transmitted optical signals. The cascaded MZI structures have large overall dimensions and experience high insertion loss. Other traditional silicon photonics multiplexers and demultiplexers include i) arrayed waveguide gratings with high fabrication sensitivities, ii) planar lightwave circuits (PLCs) with silicon photonics, and iii) indium phosphide devices with silicon photonics. The PLCs with silicon photonics and the indium phosphide devices with silicon photonics also experience high insertion loss. The term "silicon photonics" refers to a material platform from which photonic integrated circuits can be made. SOI wafers are used as semiconductor substrates on which complementary metal-oxide semiconductor (CMOS) manufacturing processes are performed to fabricate silicon photonics multiplexers and demultiplexers.

The examples set forth herein include passive multiplexers and demultiplexers having single stage MZI structures. Each of the passive multiplexers and demultiplexers includes a first arm, a second arm, a splitter and a coupler. The passive multiplexers and demultiplexers do not include heaters and/or corresponding power supplies. The first arm has a first waveguide with first dimensions. The second arm has a second waveguide with second dimensions and a third waveguide with third dimensions. Phase of the second arm is highly sensitive to changes in the dimensions of the third waveguide and less sensitive to changes in dimensions of the second waveguide. As a result, phase of the second arm is coarsely tuned by adjusting one or more parameters (e.g., length and width) of the third waveguide and finely tuned by adjusting one or more parameters (e.g., length and width) of the second waveguide. In an example embodiment, the lengths of the third waveguide and second waveguide are adjusted during fabrication to provide certain target performance parameters including free spectral range (FSR) and phase target values, which satisfy certain relationships as further described below. In an embodiment, the splitter and coupler are configured as multi-mode interferometers (MMIs). The MMIs have rectangular shaped main portions which spread signals to excite three or more different transmission modes. This is unlike direct couplers, which only excite two transmission modes. The transmission modes include a fundamental transverse electric mode TE0, a fundamental transverse magnetic mode TM0, and/or other TE and TM modes.

During fabrication, actual resulting dimensions of a multiplexer and demultiplexer can be different than target dimensions. This is referred to as fabrication bias (or fabrication variance). Fabrication variance is typically consistent for a particular fabrication system. Fabrication variance can however change the phases of the two arms of a multiplexer and demultiplexer, which can cause the multiplexer and demultiplexer to become unbalanced such that more power is passing through one of the arms as compared to the other arm. By including a first arm with a first waveguide having constant dimensions and a second arm with two waveguides having different dimensions (e.g., one having a wide width and another having a narrow width), the disclosed passive multiplexers and demultiplexers are able to be tuned to compensate for the fabrication variation. The compensation includes selecting dimensions of the waveguides of the second arm such that FSR and phase targets are satisfied, as further described below.

Figure 1A:
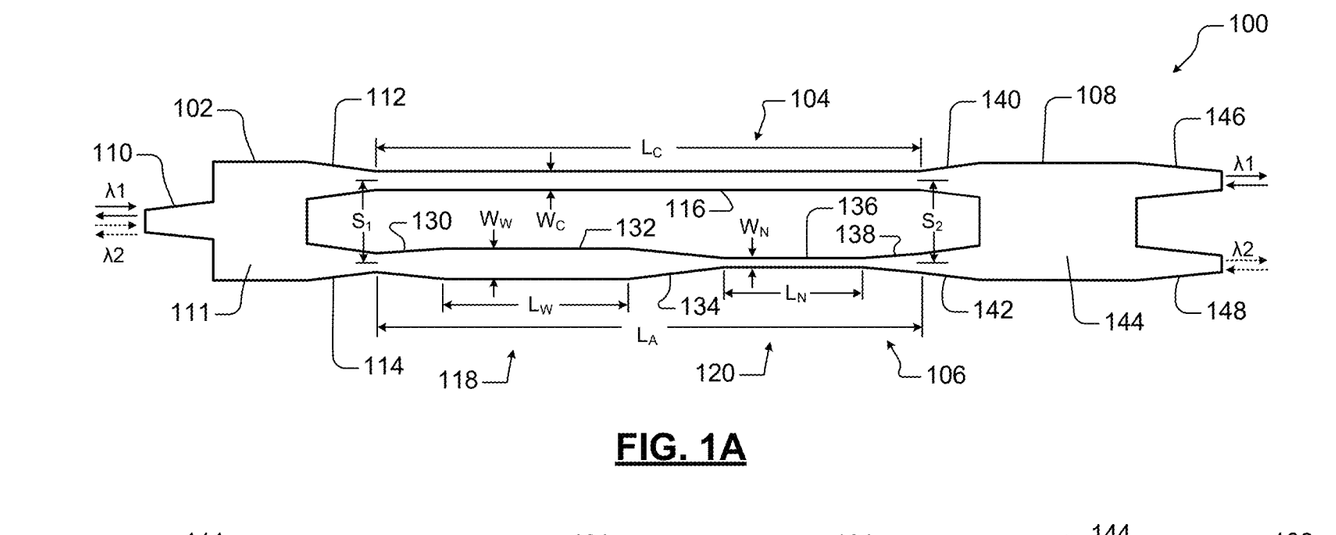
FIG. 1A is a top view of an example passive multiplexer and demultiplexer having a Mach-Zehnder interferometer (MZI) structure in accordance with the present disclosure.
Figure 1B:
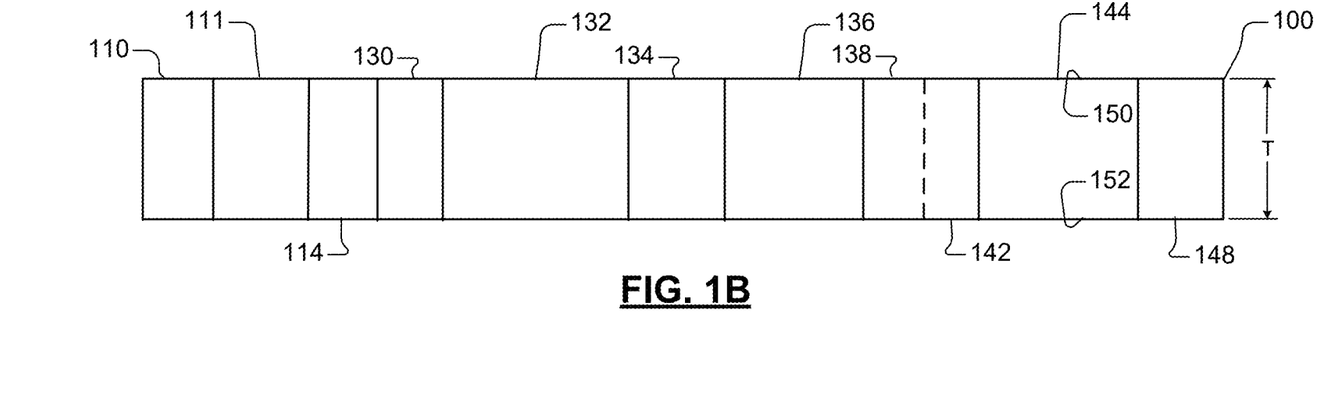
FIG. 1B is a side view of the passive multiplexer and demultiplexer of FIG. 1.

FIGS. 1A and 1B show a passive multiplexer and demultiplexer 100 having a MZI structure. The passive multiplexer and demultiplexer 100 includes a splitter 102, a first arm 104, a second arm 106, and a coupler 108. The first arm 104 is a first waveguide. The splitter 102 is a MMI that includes a first input/output (I/O) port 110, a body 111, a second I/O port 112, and a third I/O port 114. The second arm 106 has a second waveguide 118 and a third waveguide 120. The second I/O port 112 is connected to a first end of the first waveguide 116. The third I/O port 114 is connected to a first end of the second waveguide 118. A second end of the second waveguide 118 is connected to a first end of the third waveguide 120.

The second waveguide 118 has a first transition region 130, a center region 132, and at least a portion of a second transition region 134. The first transition region 130 is connected to the third I/O port 114. The center region 132 connects the transition regions 130, 134. The second transition region 134 is shared by the second waveguide 118 and the third waveguide 120. The third waveguide 120 includes at least a portion of the second transition region 134, a center region 136, and a third transition region 138. The third transition region 138 is connected to the coupler 108.

The coupler 108 is an MMI and includes a first I/O port 140, a second I/O port 142, a body 144, a third I/O port 146, and a fourth I/O port 148. In an embodiment, the body 144 has a rectangular cross-section in a plane extending parallel to top and bottom surfaces 150, 152 of the passive multiplexer and demultiplexer 100.

The passive multiplexer and demultiplexer 100 is configured for two wavelength channels centered respectively at wavelengths λ1, λ2. The passive multiplexer and demultiplexer 100 has a passive MZI structure. For example, the passive multiplexer and demultiplexer 100 does not include any active components and/or components receiving one or more control signals to change states of one or more portions of the passive multiplexer and demultiplexer 100. In an embodiment, the splitter 102 is a 1-by-2 3 decibel (dB) MMI splitter and the coupler 108 is a 2-by-2 3 dB MMI coupler. The I/O ports 112, 114 of the splitter 102 are connected respectively to ports 140, 142 of the coupler 108 via the arms 104, 106 for group and phase delay compensation.

In an embodiment, spacing (or distance) $S_1$ between centers of the ports 112, 114 is equal to the spacing (or distance) $S_2$ between centers of the ports 140, 142. The waveguide 116 has a length $L_C$. The center regions 132, 136 have respective lengths $L_W$, $L_N$. The overall length $L_A$ of the second arm 106 is equal to the overall length of the first arm 104, which is $L_C$. This minimizes sensitivities of phase delay and group delay on fabrication variance as compared to structures having arms of different lengths. The length $L_C$ is greater than the lengths $L_W$ and $L_N$ and greater than a sum of the lengths $L_W$ and $L_N$.

During operation and when operating as a multiplexer, the coupler 108 receives or transmits two optical signals having respective wavelengths λ1, λ2. As an example, the first optical signal having the first wavelength λ1 is received at the third I/O port 146 and provided to one of the I/O ports 140, 142. The second optical signal having the second wavelength λ2 is received at the fourth I/O port 148 and provided to the other one of the I/O ports 146, 148. The splitter 102 receives the optical signals having the wavelengths λ1, λ2 respectively at the I/O ports 112, 114 and provides the optical signals having the wavelengths λ1, λ2 to the I/O port 110. As an example and in an embodiment, the passive multiplexer and demultiplexer 100 when operating as a multiplexer experiences has a 1 dB bandwidth of greater than ±10 nanometers (nm).

During operation and when operating as a demultiplexer, the splitter 102 receives or transmits two optical signals having respective wavelengths λ1, λ2. As an example, the first optical signal having the first wavelength λ1 is received at the first I/O port 110 and provided to one of the I/O ports 112, 114. The second optical signal having the second wavelength λ2 is received at the first I/O port 110 and provided to the other one of the I/O port 112, 114. The coupler 108 receives the optical signals having the wavelengths λ1, λ2 respectively at the I/O ports 140, 142 and provides the optical signals having the wavelengths λ1, λ2 respectively to the I/O ports 146, 148. As an example and in an embodiment, the passive multiplexer and demultiplexer 100 experiences crosstalk between I/O ports of less than −10 dB with ±6.5 nm bandwidths from center wavelengths of transmitted signals. By cascading two of the passive multiplexer and demultiplexer 100, as shown below, crosstalk is further suppressed to less than −20 dB.

The optical signals having the wavelengths λ1, λ2 are directed to respective ports of the splitter 102 and the coupler 108 when the relationships, referred to as conditions, 1-3b are satisfied. The first relationship is that the FSR is equal to twice a difference in the wavelengths λ1, λ2. Relationships 2a, 2b, 3a, 3b relate differences in phases $\Delta\varphi_{\lambda 1}$ and $\Delta\varphi_{\lambda 2}$ between the arms 104, 106 for the wavelengths λ1, λ2, where m and n are integers.

$$FSR = (\lambda 1 - \lambda 2) \cdot 2 \tag{1}$$

$$\Delta\varphi_{\lambda 1} = \left(2n - \frac{1}{2}\right)\pi \tag{2a}$$

$$\Delta\varphi_{\lambda 2} = \left(2m + \frac{1}{2}\right)\pi \tag{2b}$$

$$\Delta\varphi_{\lambda 1} = \left(2n + \frac{1}{2}\right)\pi \tag{3a}$$

$$\Delta\varphi_{\lambda 2} = \left(2m - \frac{1}{2}\right)\pi \tag{3b}$$

If the first set of phase relationships 2a and 2b are satisfied, then the optical signal having the wavelength λ1 propagates to the I/O port 146 and the optical signal having the wavelength λ2 propagates to the I/O port 148. If the second set of phase relationships 3a and 3b are satisfied, then the optical signal having the wavelength λ1 propagates to the I/O port 148 and the optical signal having the wavelength λ2 propagates to the I/O port 146.

In an embodiment, the first waveguide 116 has a constant width $W_C$ from end-to-end. The center region 132 of the second waveguide 118 has a width $W_W$, which in one embodiment is constant from end-to-end. The center region 136 of the third waveguide 120 has a width $W_N$, which in one embodiment is constant from end-to-end. The widths are set such that $W_N<W_C<W_W$ to satisfy relationship 1 and either relationships 2a and 2b or relationships 3a and 3b. In an embodiment, the purpose of the third waveguide (or narrow waveguide) 120 is to minimize: i) a difference in phases of the arms 104, 106 for transmission of the optical signal having the wavelength λ1, ii) a difference in phases of the arms 104, 106 for transmission of the optical signal having the wavelength λ2, and iii) a phase difference between arms 104, 106 introduced by fabrication etch variation of the arms 104, 106, and iv) a difference between a) a target phase difference between phases of the arms 104, 106 and b) an actual phase difference between phases of the arms 104, 106. The width $W_N$ is selected to compensate for fabrication etch variation and minimize the effect of fabrication etch variation on the group index $n_g$ and effective refractive index $n_{\it eff}$ of each of the waveguides 116, 118.

In an embodiment, a waveguide length ratio between the center region 132 of the second (or wide) waveguide 118 and the center region 136 of the third (or narrow) waveguide 120 is, represented as $L_W/L_N$. An example expression for this ratio is provided by relationship 4 in case of short tapers 130, 134, 138, where the effective or group indices of the waveguides 116, 118, 120 are respectively $n_C$, $n_W$, $n_N$. The ratio is set equal to a difference between i) a derivative of $n_C$ with respect to the width $W_C$ of the first waveguide 116 and ii) a derivative of $n_N$ with respect to the width $W_N$ of the third waveguide 120, divided by a difference between a) a derivative of $n_W$ with respect to the width $W_W$ of the second waveguide 118 and b) a derivative of $n_C$ with respect to the width $W_C$, where W is width of the respective waveguide.

$$\frac{L_W}{L_N} = \frac{\frac{dn_C}{dW} - \frac{dn_N}{dW}}{\frac{dn_W}{dW} - \frac{dn_C}{dW}} \quad (4)$$

To compensate for fabrication variation impact on the FSR, the ratio $L_W/L_N$ is determined according to relationship 4 using group indices of the waveguides 116, 118, 120. To minimize difference in phases of the arms 104, 106 determined according to relationships 2a, 2b, 3a, 3b, the ratio $L_W/L_N$ is set based on the derivatives of the effective indices according to relationship 4. In an embodiment, the ratio $L_W/L_N$ is determined based on the effective indices and/or group indices.

In an embodiment, the length $L_C$ and width $W_C$ of the waveguide 116 and the widths $W_W$, $W_N$ of the center regions 132, 136 are first selected and then the lengths $L_W$, $L_N$ of the center regions 132, 136 are determined to satisfy certain target performance parameters (e.g., target FSR and phase difference between arms). In another embodiment, the length $L_C$ and width $W_C$ of the waveguide 116, the length $L_W$ and width $W_W$ of the center region 132, and the width $W_N$ of the center region 136 are first selected and then the length $L_N$ of the center region 136 is determined to satisfy certain target performance parameters (e.g., target FSR and phase difference between arms).

The group delay $\tau_{g,First}$ of the first arm 104 is represented by relationship 5, where c is the speed of light. The group delay $\tau_{g,second}$ of the second arm 106 is represented by relationship 6. The first term $n_{gW(\lambda)}L_W/c$ in the right-hand side of the relationship for the group delay $\tau_{g,second}$ of the second arm 106 is the group delay if the center region 132 and the second term $n_{gN(\lambda)}L_N/c$ is the group delay of the center region 136. The third term $\tau_{g,tapers}$ is the total group delay of the transition regions 130, 134, 138 (referred to as "tapers" because of their tapered structures having tapering widths).

$$\tau_{g,First} = \frac{n_{gC(\lambda)}L_C}{c} \quad (5)$$

$$\tau_{g,second} = \frac{n_{gW(\lambda)}L_W}{c} + \frac{n_{gN(\lambda)}L_N}{c} + \tau_{g,tapers} \quad (6)$$

The lengths of the arms 104, 106 are the same and as a result $L_C=L_W+L_N+\Sigma_1^3 L_{taper}$ for 3 tapers (i.e., the tapers 130, 134, 138). The FSR of the passive multiplexer and demultiplexer 100 is represented by relationship 7, where $$\lambda = \frac{\lambda^2}{(\lambda_1 - \lambda_1)}.$$

$$FSR = \frac{\lambda^2}{\tau_{g,second} - \tau_{g,first}} \quad (7)$$

Based on relationship 7, relationship 1 can be rewritten to provide relationship 8, to provide a relationship between the lengths $L_C$, $L_W$, $L_N$ and the wavelengths $\lambda_1$, $\lambda_2$. In an embodiment, relationship 8 is used when satisfying the FSR relationship and selecting one or more of the lengths $L_W$, $L_N$.

$$n_{gW(\lambda)}L_W + n_{gN(\lambda)}L_N + c \cdot \tau_{g,tapers} - n_{gC(\lambda)}L_C = \frac{\lambda^2}{(\lambda_1 - \lambda_1) \times 2} \quad (8)$$

In an embodiment, relationships 9-12b are used when minimizing phase difference between the arms 104, 106. Relationship 9 provides the delay of the first arm 104, where the first arm 104 has a constant width $W_C$. Relationship 10 provides the delay of the second arm 106, where the first term $2\pi \cdot n_{\it eff,W}L_W/\lambda$ is the phase delay of the center region 132, the second term $2\pi \cdot n_{\it eff,N}L_N/\lambda$ is phase delay of the center region 136, and the third term $\varphi_{tapers}(\lambda)$ is the total phase delay of the tapers 130, 134, 138.

$$\varphi_{first} = \frac{2\pi \cdot n_{\it eff,C}L_C}{\lambda} \quad (9)$$

$$\varphi_{second} = \frac{2\pi \cdot n_{\it eff,W}L_W}{\lambda} + \frac{2\pi \cdot n_{\it eff,N}L_N}{\lambda} + \varphi_{tapers}(\lambda) \quad (10)$$

If the optical signal having wavelength $\lambda_1$ is to propagate to the I/O port 146 through the coupler 108 and the optical signal having the wavelength $\lambda_2$ is to propagate to the I/O port 148 through the coupler 108, then the relationships 2a, 2b can be rewritten as relationships 11a, 11b.

$$\frac{2\pi \cdot n_{eff,W}(\lambda_1) L_W}{\lambda_1} + \frac{2\pi \cdot n_{eff,N}(\lambda_1) L_N}{\lambda_1} + \varphi_{tapers}(\lambda_1) - \frac{2\pi \cdot n_{eff,C}(\lambda_1) L_C}{\lambda_1} = \left(2n - \frac{1}{2}\right)\pi \quad (11a)$$

$$\frac{2\pi \cdot n_{eff,W}(\lambda_2) L_W}{\lambda_2} + \frac{2\pi \cdot n_{eff,N}(\lambda_2) L_N}{\lambda_2} + \varphi_{tapers}(\lambda_2) - \frac{2\pi \cdot n_{eff,C}(\lambda_2) L_C}{\lambda_2} = \left(2m + \frac{1}{2}\right)\pi \quad (11b)$$

If the optical signal having wavelength $\lambda_1$ is to propagate to the I/O port 148 through the coupler 108 and the optical signal having the wavelength $\lambda_2$ is to propagate to the I/O port 146 through the coupler 108, then the relationships 3a, 3b can be rewritten as relationships 15a, 15b.

$$\frac{2\pi \cdot n_{eff,W}(\lambda_1) L_W}{\lambda_1} + \frac{2\pi \cdot n_{eff,N}(\lambda_1) L_N}{\lambda_1} + \varphi_{tapers}(\lambda_1) - \frac{2\pi \cdot n_{eff,C}(\lambda_1) L_C}{\lambda_1} = \left(2n + \frac{1}{2}\right)\pi \quad (12a)$$

$$\frac{2\pi \cdot n_{eff,W}(\lambda_2) L_W}{\lambda_2} + \frac{2\pi \cdot n_{eff,N}(\lambda_2) L_N}{\lambda_2} + \varphi_{tapers}(\lambda_2) - \frac{2\pi \cdot n_{eff,C}(\lambda_2) L_C}{\lambda_2} = \left(2m - \frac{1}{2}\right)\pi \quad (12b)$$

In an embodiment, the passive multiplexer and demultiplexer 100 is a fully etched silicon waveguide (SWG). The passive multiplexer and demultiplexer is integrated into a SOI platform. See, for example, FIGS. 2A and 2B.

Figure 2A:
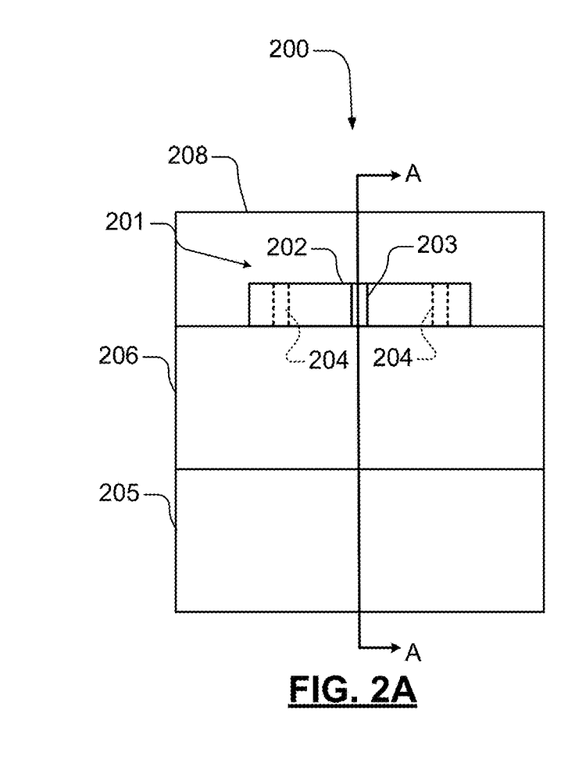
FIG. 2A is an end view of an example silicon-on-insulator (SOI) platform including a silicon photonics components in accordance with the present disclosure.
Figure 2B:
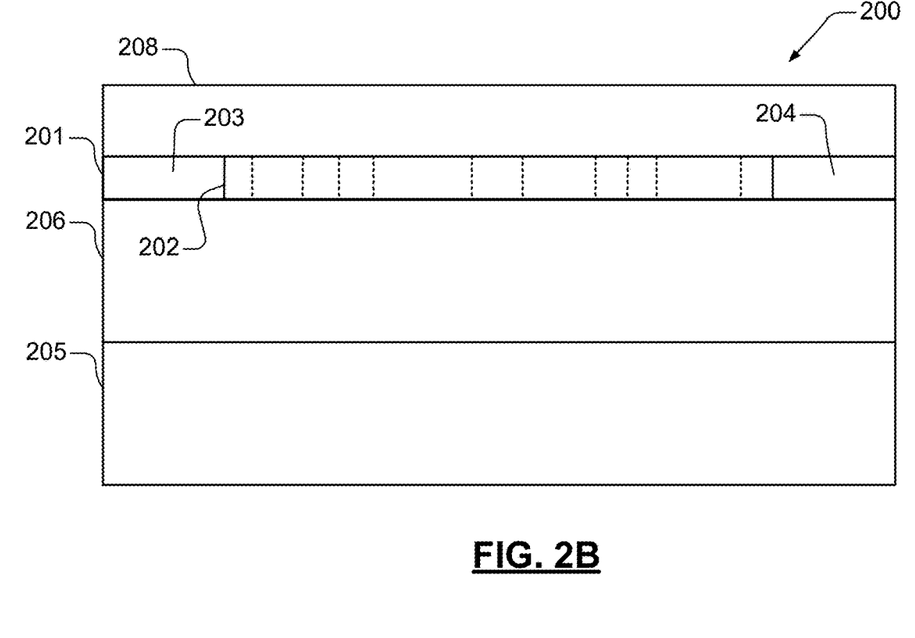
FIG. 2B is a side cross-sectional view of the SOI platform of FIG. 2A at section line A-A of FIG. 2A.

FIGS. 2A and 2B show an example silicon-on-insulator (SOI) platform 200 including silicon photonic components 201, such as a passive multiplexer and demultiplexer 202, an input waveguide 203 and output waveguides 204. The passive multiplexer and demultiplexer 202 may be implemented as the passive multiplexer and demultiplexer 100 of FIGS. 1A-1B. The SOI platform 200 includes a substrate layer 205, a buried oxide (BOX) layer 206, and an oxide cladding layer 208. In an embodiment, the passive multiplexer and demultiplexer 202 and the substrate layer 205 are formed of silicon. In an embodiment, the oxide cladding layer 208 is formed of silicon dioxide ($SiO_2$). In an embodiment, the passive multiplexer and demultiplexer 202 is embedded in the $SiO_2$ such that $SiO_2$ is disposed at least above and on the sides of the passive multiplexer and demultiplexer 202. $SiO_2$ is disposed between the arms (e.g., the arms 104, 106 of FIGS. 1A-1B) of the passive multiplexer and demultiplexer 202.

Figure 3:
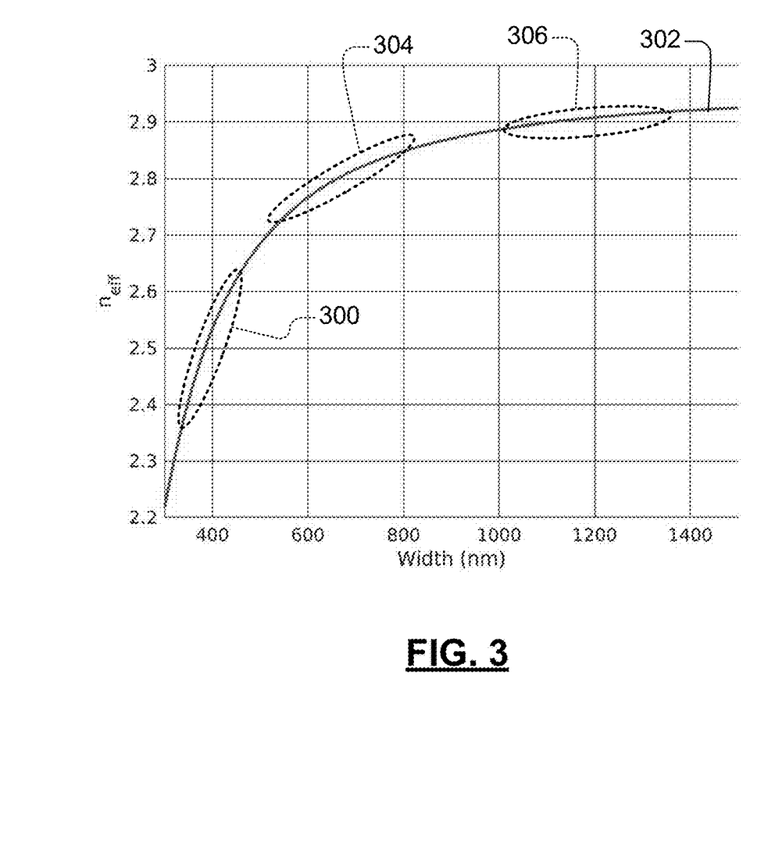
FIG. 3 is an example plot of an effective refractive index as a function of waveguide width.

FIG. 3 shows a plot of an effective refractive index as a function of waveguide width. The plot of FIG. 3 is for a transverse electric (TE) mode propagating through a fully etched silicon waveguide. As can be seen, changes in width of a narrow waveguide (e.g., the third waveguide 120 of FIGS. 1A-1B) more heavily effects the effective refractive index $n_{eff}$ than changes in widths of waveguides having larger widths (e.g., the waveguides 116, 118 of FIGS. 1A-1B). As an example, a first portion 300 of a curve 302 is circled and corresponds to example widths for the narrow waveguide 120. A second portion 304 of the curve 302 is circled and corresponds to example widths of waveguide 116. A third portion 306 of the curve 302 is circled and corresponds to example widths of the waveguide 118.

Figure 4:
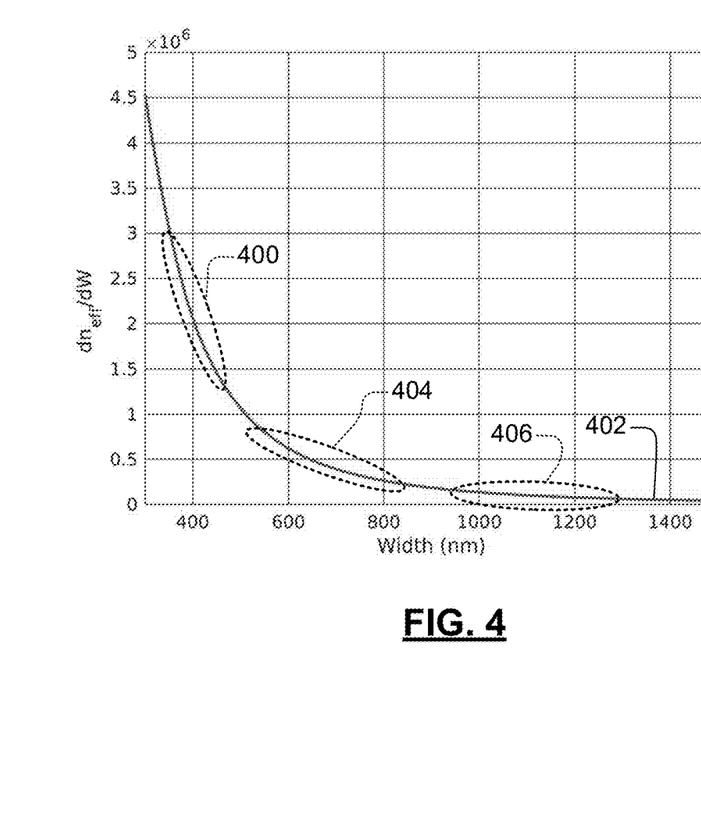
FIG. 4 is an example plot of a derivative of effective refractive index as a function of waveguide width.

FIG. 4 shows a plot of a derivative of effective refractive index $n_{eff}$ as a function of waveguide width. As can be seen, changes in width of a narrow waveguide (e.g., the third waveguide 120 of FIGS. 1A-1B) more heavily effects the derivative of effective refractive index $n_{eff}$ than changes in widths of waveguides having larger widths (e.g., the waveguides 116, 118 of FIGS. 1A-1B). As an example, a first portion 400 of a curve 402 is circled and corresponds to example widths for the narrow waveguide 120. A second portion 404 of the curve 402 is circled and corresponds to example widths of waveguide 116. A third portion 406 of the curve 402 is circled and corresponds to example widths of the waveguide 118.

Figure 5:
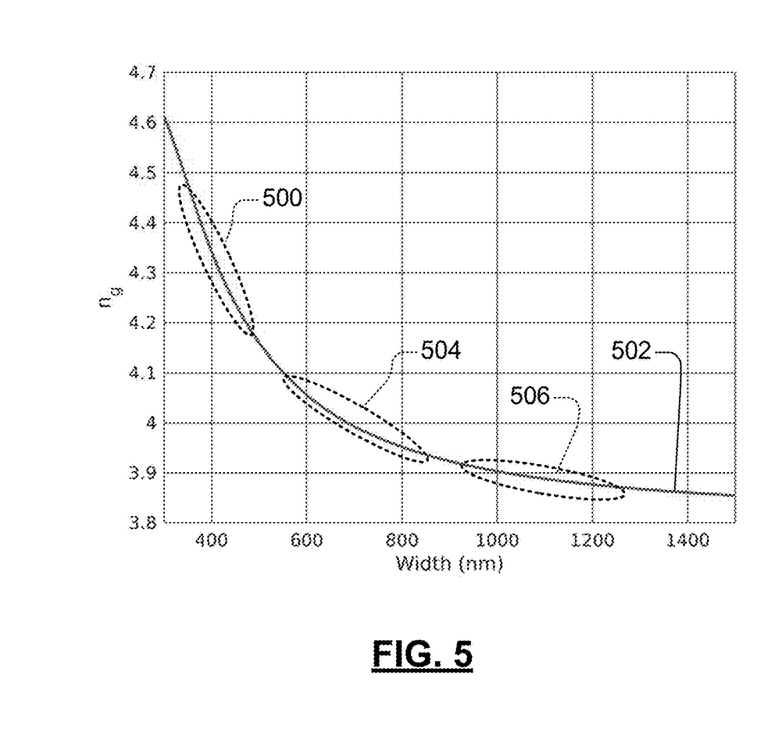
FIG. 5 is an example plot of a group index as a function of waveguide width.

FIG. 5 shows a plot of a group index $n_g$ as a function of waveguide width. As can be seen, changes in width of a narrow waveguide (e.g., the third waveguide 120 of FIGS. 1A-1B) more heavily effects the group index $n_g$ than changes in widths of waveguides having larger widths (e.g., the waveguides 116, 118 of FIGS. 1A-1B). As an example, a first portion 500 of a curve 502 is circled and corresponds to example widths for the narrow waveguide 120. A second portion 504 of the curve 502 is circled and corresponds to example widths of waveguide 116. A third portion 506 of the curve 502 is circled and corresponds to example widths of the waveguide 118.

Figure 6:
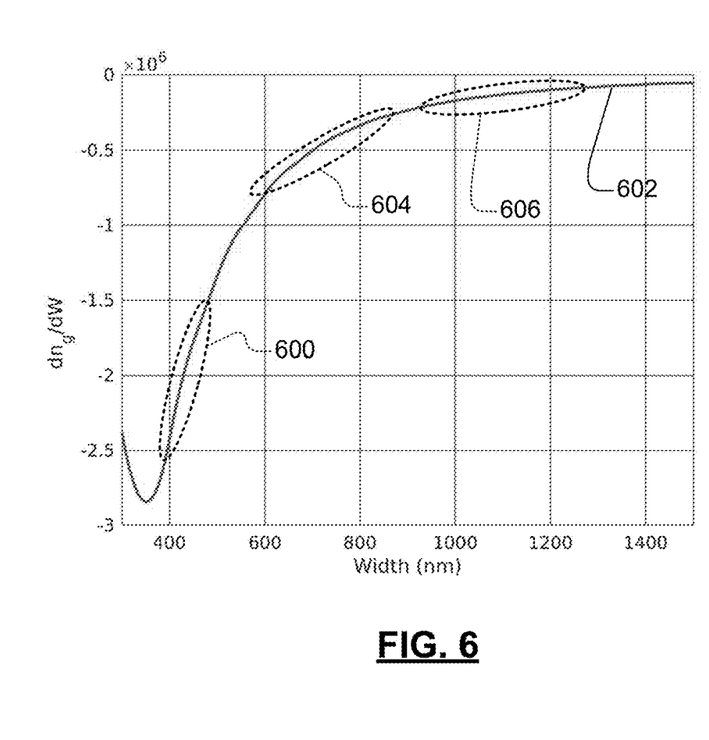
FIG. 6 is an example plot of a derivative of the group index as a function of waveguide width.

FIG. 6 shows a plot of a derivative of the group index $n_g$ as a function of waveguide width. As can be seen, changes in width of a narrow waveguide (e.g., the third waveguide 120 of FIGS. 1A-1B) more heavily effects the derivative of the group index $n_g$ than changes in widths of waveguides having larger widths (e.g., the waveguides 116, 118 of FIGS. 1A-1B). As an example, a first portion 600 of a curve 602 is circled and corresponds to example widths for the narrow waveguide 120. A second portion 604 of the curve 602 is circled and corresponds to example widths of waveguide 116. A third portion 606 of the curve 602 is circled and corresponds to example widths of the waveguide 118.

Figure 7:
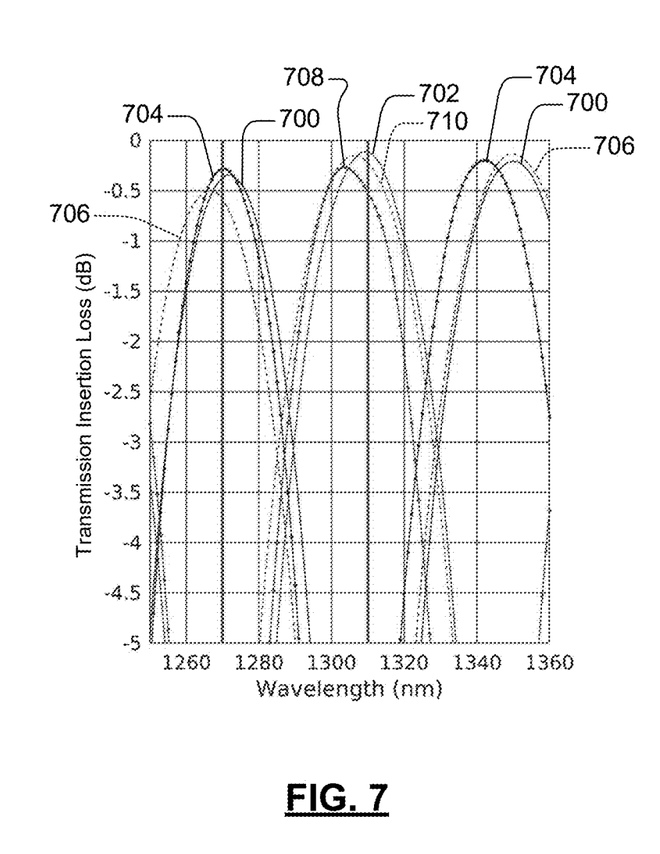
FIG. 7 is a plot of insertion losses versus signal wavelength for arms of passive multiplexers and demultiplexers including narrow waveguides in accordance with the present disclosure.

FIG. 7 shows a plot of insertion losses versus signal wavelength for first and second arms of passive multiplexers and demultiplexers including narrow waveguides, such as the passive multiplexer and demultiplexer 100 of FIGS. 1A-1B having narrow waveguide 120. An insertion loss curve 700 is shown for the passive multiplexer and demultiplexer 100 with a first arm 104 having an example target width. An insertion loss curve 702 is shown for the second arm 106 of the passive multiplexer and demultiplexer 100 having example target widths for the waveguides 118, 120. Insertion loss curves 704, 706 are shown for the passive multiplexer and demultiplexer 100 with the first arm 104 having respectively +20 nm bias (etch variation) and −20 nm bias. A +20 nm bias means that the corresponding waveguides are 20 nm narrower than the target width values. A −20 nm bias means that the corresponding waveguides are 20 nm wider than the target width values. Insertion loss curves 708, 710 are shown for the passive multiplexer and demultiplexer 100 with the second arm 106 having respectively +20 nm bias and −20 nm bias.

Figure 8:
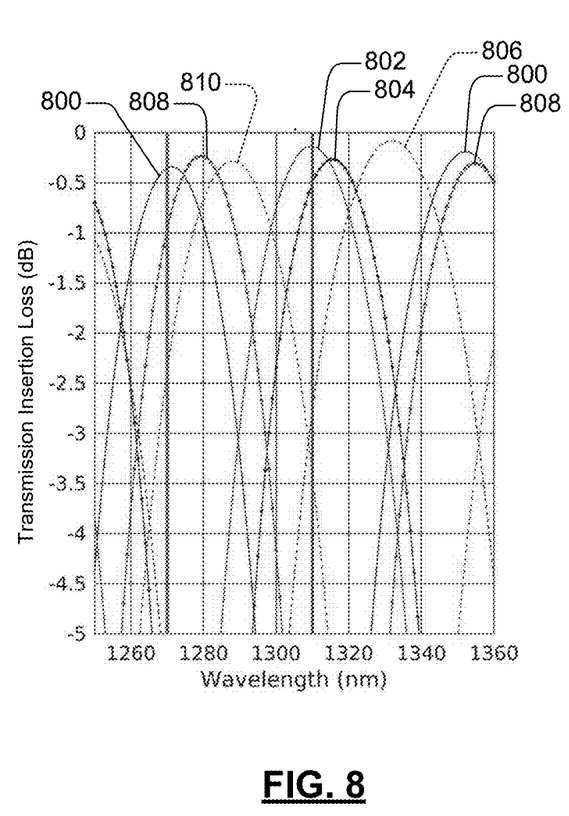
FIG. 8 is a plot of insertion losses versus signal wavelength for arms of passive multiplexers and demultiplexers without narrow waveguides.

FIG. 8 shows a plot of insertion losses versus signal wavelength for arms of passive multiplexers and demultiplexers without narrow waveguides. As an example, each of the passive multiplexers and demultiplexers may be configured as the passive multiplexer and demultiplexer 100 of FIG. 1 except being absent the narrow waveguide 120 (or the length of the narrow waveguide is 0) such that the wide waveguide 118 is connected to the coupler 108. An insertion loss curve 800 is shown for passive multiplexer and demultiplexer with a first arm (e.g., an arm similar to the first arm 104 of FIG. 1) having an example constant target width. An insertion loss curve 802 is shown for a second arm of the passive multiplexer and demultiplexer (e.g., an arm similar to the second arm 106 of FIG. 1 but without the narrow waveguide 120) having an example target width. Insertion loss curves 804, 806 are shown for a passive multiplexer and demultiplexer with a first arm having respectively +20 nm bias (etch variation) and −20 nm bias. Insertion loss curves 808, 810 are shown for a passive multiplexer and demultiplexer with a second arm having respectively +20 nm bias and −20 nm bias.

Comparison of the curves 700, 702, 704, 706, 708, 710 of FIG. 7 to the curves 800, 802, 804, 806, 808, 810 of FIG. 8 indicates that narrow waveguide compensation (i.e., inclusion of the narrow waveguide) aids in stabilizing FSR and phase relationships such that wavelength propagation of the arms of a passive multiplexer and demultiplexer closely matches target wavelengths for the arms. Without the narrow waveguide, the FSR and phase relationships are not stable and wavelength propagation of the arms may not match the target wavelengths, as shown by significant differences in wavelengths of peaks of the curves 800, 802, 804, 806, 808, 810 of FIG. 8.

Figure 9:
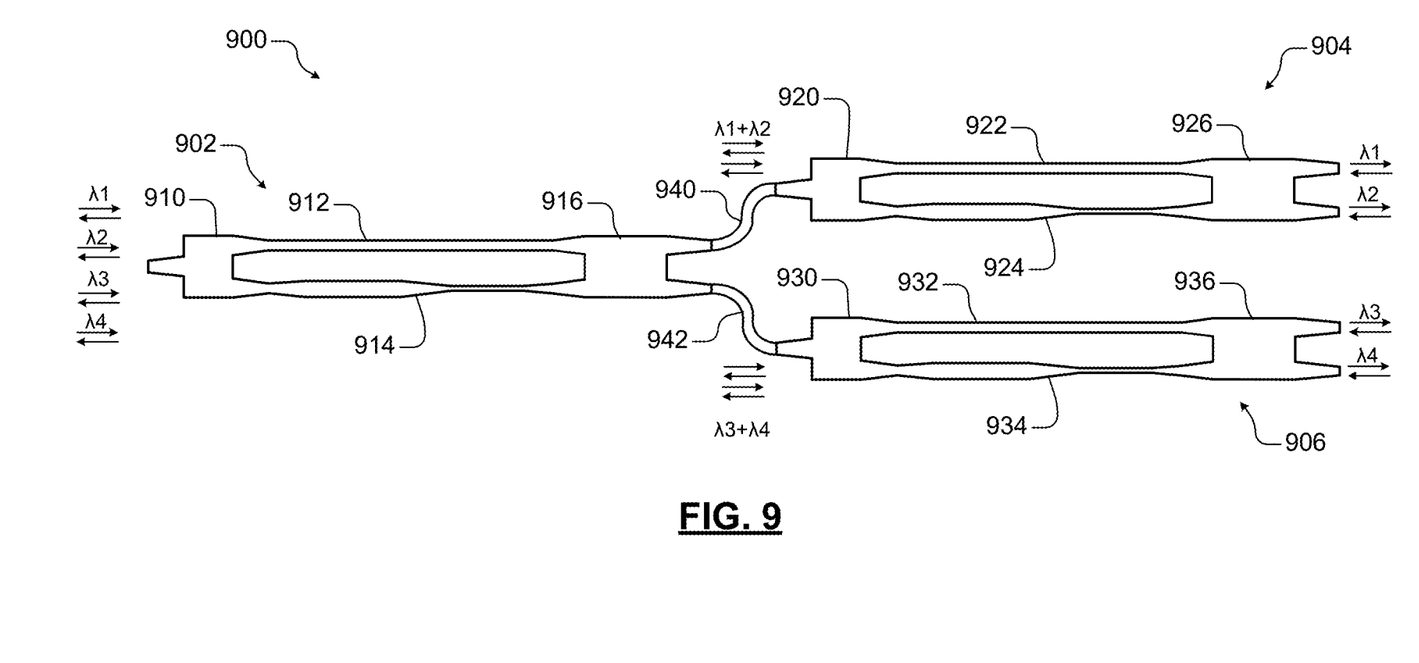
FIG. 9 is a cascaded passive multiplexer and demultiplexer in accordance with the present disclosure.

FIG. 9 shows a cascaded passive multiplexer and demultiplexer 900 that includes a first passive multiplexer and demultiplexer 902, a second passive multiplexer and demultiplexer 904, and a third passive multiplexer and demultiplexer 906. In an embodiment, each of the passive multiplexers and demultiplexers 902, 904, 906 is configured similarly as the passive multiplexer and demultiplexer 100 of FIGS. 1A-1B. The first passive multiplexer and demultiplexer 902 includes a splitter 910, first arm 912, second arm 914 and coupler 916. The second passive multiplexer and demultiplexer 904 includes a splitter 920, first arm 922, second arm 924 and coupler 926. The third passive multiplexer and demultiplexer 906 includes a splitter 930, first arm 932, second arm 934 and coupler 936. The coupler 916 is connected to the splitters 920, 930 via a first waveguide 940 and a second waveguide 942. Although a specific number of passive multiplexers and demultiplexers are shown, any number of passive multiplexers and demultiplexers may be cascaded together. In the example of FIG. 9, four optical signals having respective wavelengths $\lambda_1$, $\lambda_2$, $\lambda_3$, and $\lambda_4$ are transmitted via the cascaded passive multiplexer and demultiplexer 900.

Figure 10:
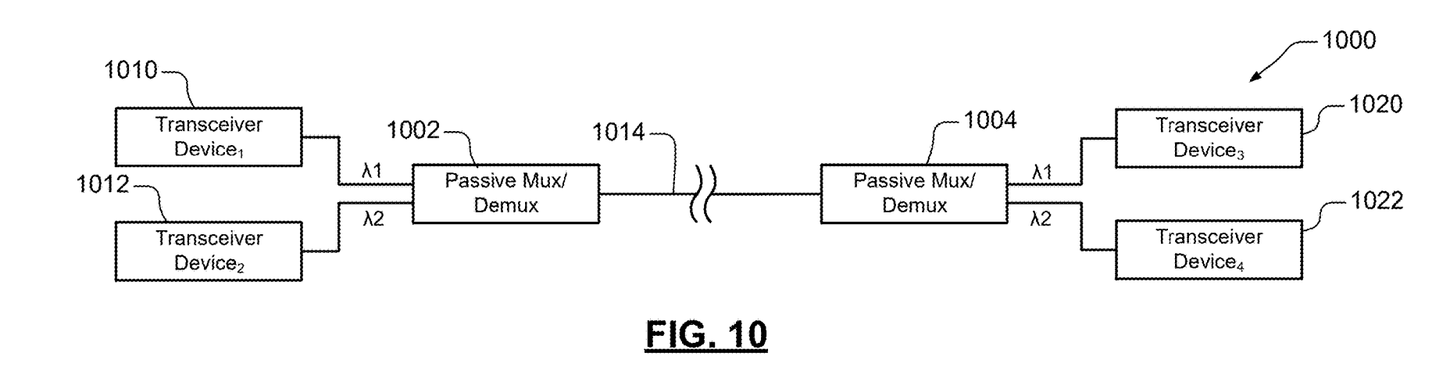
FIG. 10 is a functional block diagram of an optical communication system including a passive multiplexer and a passive demultiplexer in accordance with the present disclosure.

FIG. 10 shows an optical communication system 1000 including a passive multiplexer and demultiplexer 1002 and a passive multiplexer and demultiplexer 1004. In an embodiment, each of the passive multiplexer and demultiplexers 1002, 1004 is configured similarly as the passive multiplexer and demultiplexer 100 of FIGS. 1A-1B and used as one of a passive multiplexer or a passive demultiplexer. In an example, the passive multiplexer and demultiplexer 1002 is operated as a passive multiplexer and is connected to transceiver devices 1010, 1012, which are transmitting optical signals having wavelengths $\lambda_1$, $\lambda_2$. The passive multiplexer 1002 combines the optical signals and outputs the combined optical signals to a transmission medium 1014. The optical signals are transmitted over the transmission medium 1014 to the passive multiplexer and demultiplexer 1004, which is operated as a passive demultiplexer. The passive demultiplexer 1004 separates the optical signals and provides the optical signals to respective transceiver devices 1020, 1022. Each of the transceiver devices 1010, 1012, 1020, 1022 may operate as a transmitter or a receiver. In the example shown, the transceiver devices 1010, 1012 are operated as transmitters and the transceiver devices 1020, 1022 are operated as receivers. When the transceiver devices 1020, 1022 are operated as transmitters and the transceiver devices 1010, 1012 are operated as receivers, the passive multiplexer and demultiplexer 1004 is operated as a passive multiplexer and the passive multiplexer and demultiplexer 1002 is operated as a passive demultiplexer.

Figure 11:
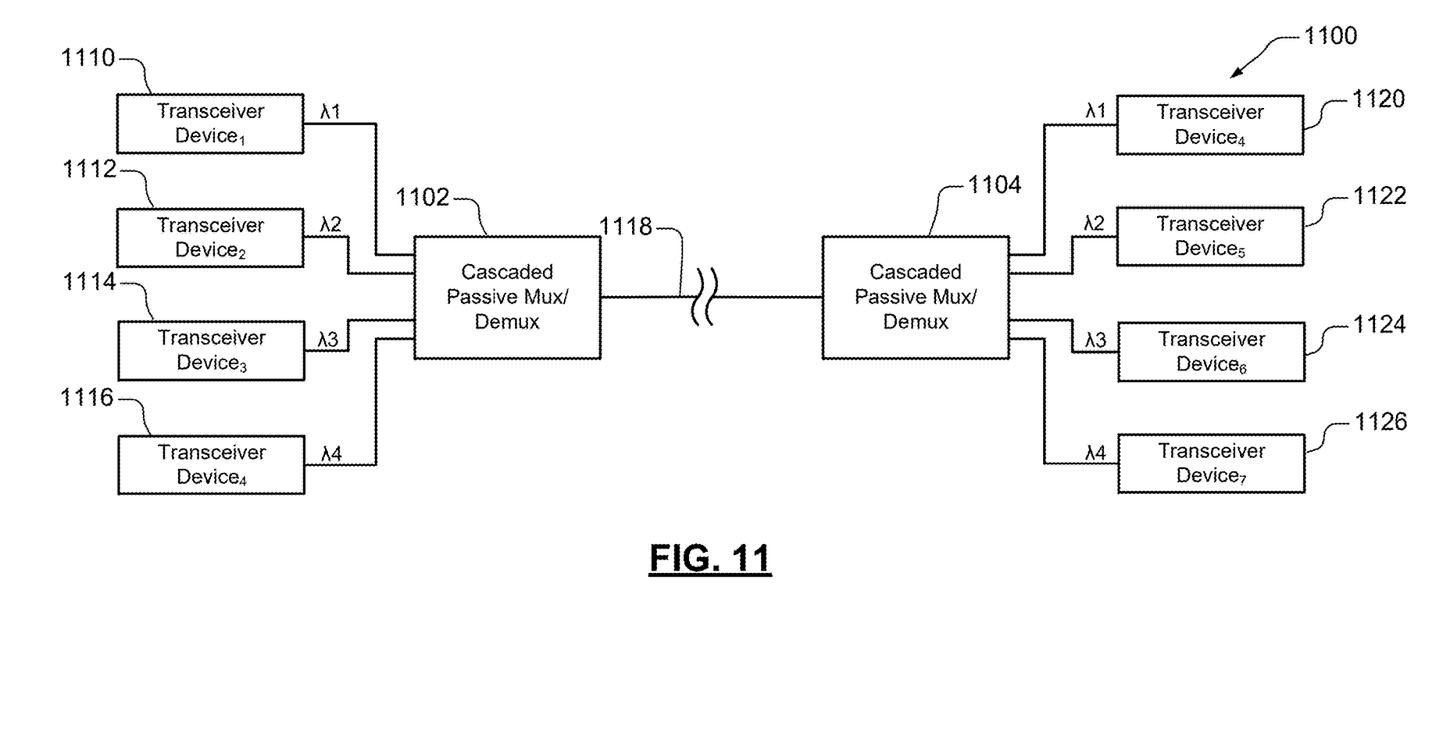
FIG. 11 is a functional block diagram of an optical communication system including a cascaded passive multiplexer and a cascaded passive demultiplexer in accordance with the present disclosure.

FIG. 11 shows an optical communication system 1100 including a cascaded passive multiplexer and demultiplexer 1102 and a cascaded passive demultiplexer and demultiplexer 1104. In an embodiment, each of the cascaded passive multiplexer and demultiplexers 1102, 1104 is configured similarly as the cascaded passive multiplexer and demultiplexer 900 of FIG. 9 and used as one of a cascaded passive multiplexer or a cascaded passive demultiplexer. In an example, the cascaded passive multiplexer and demultiplexer 1102 is operated as a cascaded passive multiplexer and is connected to transceiver devices 1110, 1112, 1114, 1116, which are transmitting optical signals having wavelengths $\lambda_1$, $\lambda_2$, $\lambda_3$, $\lambda_4$. The cascaded passive multiplexer 1102 combines the optical signals and outputs the combined optical signals to a transmission medium 1118. The optical signals are transmitted over the transmission medium 1118 to the cascaded passive multiplexer and demultiplexer 1104, which is operating as a cascaded passive demultiplexer. The cascaded passive demultiplexer 1104 separates the optical signals and provides the optical signals to respective transceiver devices 1120, 1122, 1124, 1126. Each of the transceiver devices 1110, 1112, 1114, 1116, 1120, 1122, 1124, 1126 may operate as a transmitter or a receiver. In the example shown, the transceiver devices 1110, 1112, 1114, 1116 are operated as transmitters and the transceiver devices 1120, 1122, 1124, 1126 are operated as receivers. When the transceiver devices 1120, 1122, 1124, 1126 are operated as transmitters and the transceiver devices 1110, 1112, 1114, 1116 are operated as receivers, the cascaded passive multiplexer and demultiplexer 1104 is operated as a cascaded passive multiplexer and the cascaded passive multiplexer and demultiplexer 1102 is operated as a cascaded passive demultiplexer.

The examples disclosed herein include SOI platforms with passive multiplexers and demultiplexers having MZI structures with MMI splitters and couplers. The SOI platforms are fully compatible with CMOS processing. The disclosed examples are silicon photonics implementations that have high fabrication variance tolerance due to the inclusion of an arm which has two waveguides with tunable dimensions for fabrication variance compensation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between layers, waveguides, regions, etc.) are described using various terms, including "connected" and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various circuit elements, components, waveguides, arms, regions, etc. these circuit elements, components, waveguides, arms, regions, etc. should not be limited by these terms, unless otherwise indicated. These terms may be only used to distinguish one circuit element, component, waveguide, arm, region, etc. from another circuit element, component, waveguide, arm, region, etc. Terms such as "first," "second," and other numerical terms when used herein do not imply a sequence or order unless clearly indicated by the context. Thus, a first circuit element, component, waveguide, arm, region, etc. could be termed a second circuit element, component, waveguide, arm, region, etc. without departing from the teachings of the example embodiments.

What is claimed is:

1. An optical communication system comprising:
   a transceiver device configured to receive or transmit a plurality of optical signals having respective wavelengths; and
   a first passive multiplexer and demultiplexer having a Mach-Zehnder interferometer structure and configured to transmit the plurality of optical signals directly or indirectly to the transceiver device or to receive the plurality of optical signals directly or indirectly from the transceiver device and to operate as a passive multiplexer or a passive demultiplexer, the first passive multiplexer and demultiplexer comprising
      a first arm comprising a first waveguide, the first arm having a first dimension,
      a second arm comprising i) a second waveguide, and ii) a third waveguide, the second waveguide having a second dimension, the third waveguide having a third dimension, the second dimension being based on the first dimension and finely adjusts at least one performance parameter of the first passive multiplexer and demultiplexer, and the third dimension being based on the first dimension and coarsely adjusts the at least one performance parameter,
      a splitter configured to perform a demultiplexing or multiplexing operation including propagating, based on the respective wavelengths, the plurality of optical signals between i) a first port and ii) the first waveguide and the second waveguide, and
      a coupler configured to propagate, based on the respective wavelengths, the plurality of optical signals between i) the first waveguide and the third waveguide and ii) a second port and a third port.

2. The optical communication system of claim 1, wherein the first waveguide has a first constant width from a first end of the first waveguide at the splitter to a second end of the first waveguide at the coupler.

3. The optical communication system of claim 2, wherein:
   the second waveguide comprises a first central region having a second constant width from a first end of the first central region near the splitter to a second end of the first central region near the third waveguide; and
   the third waveguide comprises a second central region having a third constant width from a first end of the second central region near the second waveguide to a second end of the second central region near the coupler.

4. The optical communication system of claim 1, wherein:
   the first waveguide has a first width;
   the second waveguide has a second width;
   the third waveguide has a third width;
   the second width is greater than the first width; and
   the third width is smaller than the first width.

5. The optical communication system of claim 1, wherein the at least one performance parameter comprises at least one of free spectral range of the passive multiplexer and demultiplexer, phase delay of the second arm, and phase difference between the first arm and the second arm.

6. The optical communication system of claim 1, wherein:
   the splitter is configured to propagate a first optical signal having a first wavelength and a second optical signal having a second wavelength, the plurality of optical signals comprising the first optical signal and the second optical signal; and
   the first dimension, the second dimension and the third dimension provide a free spectral range of the passive multiplexer and demultiplexer of twice a difference between the first wavelength and the second wavelength.

7. The optical communication system of claim 1, wherein:
   the splitter is configured to propagate a first optical signal having a first wavelength and a second optical signal having a second wavelength, the plurality of optical signals comprising the first optical signal and the second optical signal; and
   a length of the first waveguide, a length of the second waveguide, and a length of the third waveguide provide a free spectral range of the passive multiplexer and demultiplexer of twice a difference between the first wavelength and the second wavelength.

8. The optical communication system of claim 1, wherein at least one of the splitter and the coupler is a multi-mode interferometer.

9. The optical communication system of claim 1, wherein:
   the splitter is configured to propagate a first optical signal having a first wavelength and a second optical signal having a second wavelength, the plurality of optical signals comprising the first optical signal and the second optical signal; and
   a phase difference between the first arm and the second arm for the first wavelength is equal to $(2n-1/2)\pi$, where n is an integer; and
   a phase difference between the first arm and the second arm for the second wavelength is equal to $(2m+1/2)\pi$, where m is an integer.

10. The optical communication system of claim 1, wherein:
   the splitter is configured to propagate a first optical signal having a first wavelength and a second optical signal having a second wavelength, the plurality of optical signals comprising the first optical signal and the second optical signal; and a phase difference between the first arm and the second arm for the first wavelength is equal to $(2m+1/2)\pi$, where n is an integer; and a phase difference between the first arm and the second arm for the second wavelength is equal to $(2n-1/2)\pi$, where m is an integer.

11. The optical communication system of claim 1, wherein:

the second waveguide comprises
a first central region, and
a first transition region connecting a port of the splitter to the first central region;

a second transition region is connected to the first central region; and the third waveguide comprises
a second central region connected to the second transition region, and
a third transition region connecting the second central region to the coupler.

12. The optical communication system of claim 11, wherein:

a length of the first waveguide is equal to a sum of the lengths of the second waveguide and the third waveguide; and the second waveguide and the third waveguide comprise respective portions of the second transition region.

13. The optical communication system of claim 1, wherein an overall length of the first arm is equal to an overall length of the second arm.

14. The optical communication system of claim 1, wherein:

the splitter comprises a first port connected to the first arm and a second port connected to the second arm;

the coupler comprises a first port connected to the first arm and a second port connected to the second arm; and a first distance between a center of the first port of the splitter and a center of the second port of the splitter is equal to a second distance between a center of the first port of the coupler and a center of the second port of the coupler.

15. The optical communication system of claim 1, wherein the splitter, the first arm, the second arm and the coupler comprise silicon.

16. The optical communication system of claim 1, further comprising a silicon-on-insulator platform comprising:

a substrate comprising silicon;
a buried oxide layer disposed on the substrate; and
an oxide cladding layer comprising the first passive multiplexer and demultiplexer.

17. The optical communication system of claim 1, further comprising a cascaded passive multiplexer and demultiplexer comprising the first passive multiplexer and demultiplexer, the cascaded passive multiplexer and demultiplexer configured to transmit the plurality of optical signals directly or indirectly to the transceiver device or to receive the plurality of optical signals directly or indirectly from the transceiver device and to operate as a cascaded passive multiplexer or a cascaded passive demultiplexer.

18. The optical communication system of claim 1, wherein:

the splitter is configured, when operating as a demultiplexer, to separate the plurality of optical signals received from the first port and guide the plurality of optical signals respectively to the first waveguide and the second waveguide; and the splitter is configured, when operating as a multiplexer, to receive the plurality of optical signals respectively from the first waveguide and the second waveguide and output the plurality of optical signals via the first port.

19. The optical communication system of claim 1, wherein the splitter is configured to receive a first optical signal having a first wavelength and a second optical signal having a second wavelength at the first port and separate the first optical signal from the second optical signal.

20. The optical communication system of claim 1, wherein at least one of the splitter and the coupler comprises a rectangular-shaped main portion, which spreads optical signals to excite three or more different transmission modes.

21. An optical communication system comprising:

a transceiver device configured to transmit or receive a plurality of optical signals having respective wavelengths; and a first passive multiplexer and demultiplexer having a Mach-Zehnder interferometer structure and configured to transmit the plurality of optical signals directly or indirectly to the transceiver device or to receive the plurality of optical signals directly or indirectly from the transceiver device and to operate as a passive multiplexer or a passive demultiplexer, the first passive multiplexer and demultiplexer comprising a first arm comprising a first waveguide, the first arm having a first width, a second arm comprising i) a second waveguide, and ii) a third waveguide, the second waveguide having a second width, the third waveguide having a third width, the second width being greater than the first width, and the third width being smaller than the first width, a splitter configured to perform a demultiplexing or multiplexing operation including propagating, based on the respective wavelengths, the plurality of optical signals between i) a first port and ii) the first waveguide and the second waveguide, and a coupler configured to propagate, based on the respective wavelengths, the plurality of optical signals between i) the first waveguide and the third waveguide and ii) a second port and a third port.

22. The optical communication system of claim 21, wherein:

the second width is greater than the first width; and
the third width is smaller than the first width.

23. The optical communication system of claim 21, wherein:

the splitter is configured to propagate a first optical signal having a first wavelength and a second optical signal having a second wavelength, the plurality of optical signals comprising the first optical signal and the second optical signal; and a length of the first waveguide, a length of the second waveguide, and a length of the third waveguide provide a free spectral range of the passive multiplexer and demultiplexer of twice a difference between the first wavelength and the second wavelength.

24. The optical communication system of claim 21, wherein at least one of the splitter and the coupler is a multi-mode interferometer.

25. The optical communication system of claim 21, wherein:

the splitter is configured to propagate a first optical signal having a first wavelength and a second optical signal having a second wavelength, the plurality of optical signals comprising the first optical signal and the second optical signal; and a phase difference between the first arm and the second arm for the first wavelength is equal to $(2n-1/2)\pi$, where n is an integer; and a phase difference between the first arm and the second arm for the second wavelength is equal to $(2m+1/2)\pi$, where m is an integer.

26. The optical communication system of claim 21, wherein:

the splitter is configured to propagate a first optical signal having a first wavelength and a second optical signal having a second wavelength, the plurality of optical signals comprising the first optical signal and the second optical signal; and a phase difference between the first arm and the second arm for the first wavelength is equal to $(2m+1/2)\pi$, where n is an integer; and a phase difference between the first arm and the second arm for the second wavelength is equal to $(2n-1/2)\pi$, where m is an integer.

27. The optical communication system of claim 21, wherein:

the second waveguide comprises
 a first central region, and
 a first transition region connecting a port of the splitter to the first central region;
a second transition region connected to the first central region; and
the third waveguide comprises
 a second central region is connected to the second transition region, and
 a third transition region connecting the second central region to the coupler.

28. The optical communication system of claim 27, wherein:

a length of the first waveguide is equal to a sum of the lengths of the second waveguide and the third waveguide; and the second waveguide and the third waveguide comprise respective portions of the second transition region.

29. The optical communication system of claim 21, wherein an overall length of the first arm is equal to an overall length of the second arm.

30. The optical communication system of claim 21, further comprising a cascaded passive multiplexer and demultiplexer comprising the first passive multiplexer and demultiplexer, the cascaded passive multiplexer and demultiplexer configured to transmit the plurality of optical signals directly or indirectly to the transceiver device or to receive the plurality of optical signals directly or indirectly from the transceiver device and to operate as a cascaded passive multiplexer or a cascaded passive demultiplexer.

31. A passive multiplexer and demultiplexer having a Mach-Zehnder interferometer structure, the passive multiplexer and demultiplexer comprising:

a first arm comprising a first waveguide, the first arm having a first dimension;

a second arm comprising i) a second waveguide, and ii) a third waveguide, the second waveguide having a second dimension, the third waveguide having a third dimension, the second dimension being based on the first dimension and finely adjusts at least one performance parameter of the passive multiplexer and demultiplexer, and the third dimension being based on the first dimension and coarsely adjusts the at least one performance parameter;

a splitter configured to perform a demultiplexing or multiplexing operation including propagating, based on respective wavelengths, a plurality of optical signals having respective wavelengths between i) a first port and ii) the first waveguide and the second waveguide; and a coupler configured to propagate, based on the respective wavelengths the plurality of optical signals between i) the first waveguide and the third waveguide and ii) a second port and a third port.

32. A passive multiplexer and demultiplexer having a Mach-Zehnder interferometer structure, the passive multiplexer and demultiplexer comprising:

a first arm comprising a first waveguide, the first arm having a first width;

a second arm comprising i) a second waveguide, and ii) a third waveguide, the second waveguide having a second width, the third waveguide having a third width, the second width being greater than the first width, and the third width being smaller than the first width;

a splitter configured to perform a demultiplexing or multiplexing operation including propagating, based on respective wavelengths, a plurality of optical signals having respective wavelengths between i) a first port and ii) the first waveguide and the second waveguide; and a coupler configured to propagate, based on the respective wavelengths, the plurality of optical signals between i) the first waveguide and the third waveguide and ii) a second port and a third port.

33. An optical communication system comprising:

a transceiver device configured to receive or transmit a plurality of optical signals; and a first passive multiplexer and demultiplexer having a Mach-Zehnder interferometer structure and configured to transmit the plurality of optical signals directly or indirectly to the transceiver device or to receive the plurality of optical signals directly or indirectly from the transceiver device and to operate as a passive multiplexer or a passive demultiplexer, the first passive multiplexer and demultiplexer comprising a first arm comprising a first waveguide, the first arm having a first dimension, a second arm comprising i) a second waveguide, and ii) a third waveguide, the second waveguide having a second dimension, the third waveguide having a third dimension, the second dimension being based on the first dimension and finely adjusts at least one performance parameter of the first passive multiplexer and demultiplexer, and the third dimension being based on the first dimension and coarsely adjusts the at least one performance parameter, wherein a length of the first waveguide is equal to a sum of the lengths of the second waveguide and the third waveguide, a splitter configured to propagate the plurality of optical signals having respective wavelengths between i) a first port and ii) the first waveguide and the second waveguide, and a coupler configured to propagate the plurality of optical signals between i) the first waveguide and the third waveguide and ii) a second port and a third port.

* * * * *